(No Model.)

F. G. POWERS.
CALF WEANER.

No. 467,830.  Patented Jan. 26, 1892.

WITNESSES:
J. Henry Theberath
C. Sedgwick

INVENTOR
F. G. Powers
BY Munn & Co
ATTORNEYS.

UNITED STATES PATENT OFFICE.

FRANCIS G. POWERS, OF NEW SALEM, KANSAS.

CALF-WEANER.

SPECIFICATION forming part of Letters Patent No. 467,830, dated January 26, 1892.

Application filed July 21, 1891. Serial No. 400,203. (No model.)

*To all whom it may concern:*

Be it known that I, FRANCIS G. POWERS, of New Salem, in the county of Cowley and State of Kansas, have invented a new and useful Improvement in Calf-Weaners, of which the following is a full, clear, and exact description.

My invention relates to an improvement in calf-weaners; and has for its object to provide a device adapted for attachment to the nostrils of a calf or other animal to be weaned, which attachment will not inconvenience the animal and will not interfere with feeding or grazing. A further object of this invention is to provide such a device of simple, durable, and economic construction.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
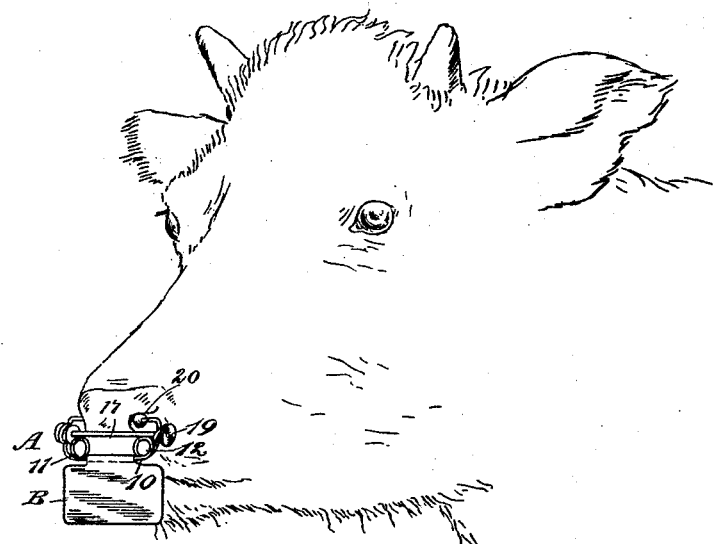
Figure 2:
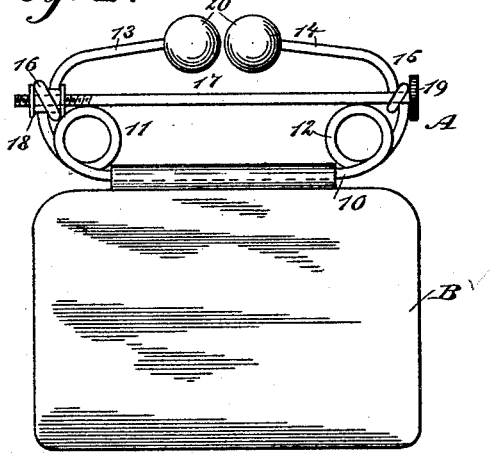

Figure 1 is a perspective view of the device on a small scale, illustrating its application to the nostrils of an animal. Fig. 2 is a front elevation of the device drawn upon a larger scale than that illustrated in Fig. 1, and Fig. 3 is an edge view thereof.

The weaner may be said to practically consist of a body A, and an apron B, pendent from the body. The body is constructed of wire having spring qualities, and the said wire is bent upon itself to form a lower practically horizontal bar 10, and at each end of the bar thus formed the wire is bent upon itself, forming two opposite coils 11 and 12. From the coils the ends of the wire are carried upward, and thence horizontally in direction of each other, completing thereby a skeleton frame, the under side of which is the bar 10, and the upper side the two ends 13 and 14 of the wire, the ends of the frame having preferably formed therein eyes 15 and 16, the said eyes being horizontally opposite, or nearly so. The eye 15 is adapted to constitute a bearing for a shaft 17, and the eye 16 forms a grip for a nut 18. The end of the shaft 17 adjacent to the eye 15 is provided with a head 19, and the opposite end of the shaft is threaded to pass through the nut 18, as illustrated in Fig. 2. The extremities of the upper portions 13 and 14 of the body-frame A are made to terminate in elastic balls or pads 20, and these balls or pads are ordinarily produced by forming upon the extremities of the wire constituting the frame enlargements, which enlargements are covered with rubber or a like soft and elastic material.

By forming the coils 11 and 12 in the body-frame a spring action is imparted to the upper portions or extremities 13 and 14 thereof. Thus the balls or pads may be drawn apart, and when released will quickly return to their normal position, which is in close proximity to each other.

Figure 3:
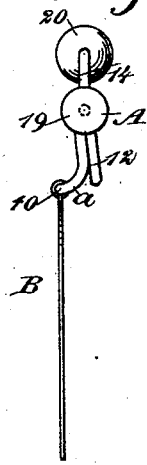

Preferably the lower bar 10, formed in the body-frame, is made to extend horizontally outward beyond the vertical plane of the body, as illustrated at *a* in Fig. 3, and upon this bar the apron B, which may be of any approved material, preferably light sheet metal, is hinged, the knuckle of the apron being located between the coils 11 and 12; but if in practice it is found desirable the apron may be hinged upon the shaft 17, in which event the frame is so manipulated that the shaft will extend outward beyond the vertical plane of its outer face a like distance to the lower bar 10; and I desire it to be distinctly understood that instead of forming the eyes 15 and 16 in the frame any other suitable bearings may be provided for the shaft.

In operation the balls or pads 20 are sprung apart a sufficient distance to permit one to enter each nostril of the animal to which the device is to be applied, as shown in Fig. 1, and by manipulating the shaft 17 the pads may be adjusted toward each other a sufficient distance to cause them to thoroughly clamp the nostril without injuring it and hold the balls or pads in such position. The shaft is provided as an adjunct to the spring extremities of the body carrying the pads to insure the maintenance of the device in position upon the animal.

When the body of the device has been placed in the position above described, the apron will fall down over the mouth and effectually prevent the animal from nursing;

but when the animal holds its head in the natural position for feeding or grazing the apron will swing outward and not interfere with that operation.

Having thus described my invention, I claim as new and desire to secure by Letters Patent—

1. A calf-weaner consisting of a body in the shape of a skeleton spring-frame, the upper portion whereof is divided and the extremities provided with soft pads or balls, an apron pivoted to the lower portion of the frame, and a shaft connected with the frame and threaded at one end to enter a threaded aperture in the frame, whereby the two pads may be carried outward or inward in direction of each other, as and for the purpose specified.

2. In a calf-weaner, the combination, with the body portion thereof, consisting of wire bent, essentially, to rectangular shape, the ends of the wire being in close proximity at the upper portion of the frame and provided with attached balls or pads, and the lower portion of the frame having spring-coils formed therein, of a nut secured to one end of the frame, a shaft journaled in the frame, one end of which is threaded to enter the nut, and an apron pendent from the frame, as and for the purpose specified.

3. A calf-weaner consisting of the body A, provided with the balls 20 at its ends, the coils 11 and 12, and the eyes 15 and 16, the nut 18 in the eye 16, the headed shaft 17, having one end screw-threaded, and the apron B, pivoted to the body, substantially as herein shown and described.

FRANCIS G. POWERS.

Witnesses:
 JOE GILLETT,
 GEO. W. JACKSON.